June 19, 1934.  H. T. HUNTER  1,963,913
PULLEY
Filed July 13, 1931
FIG. I.
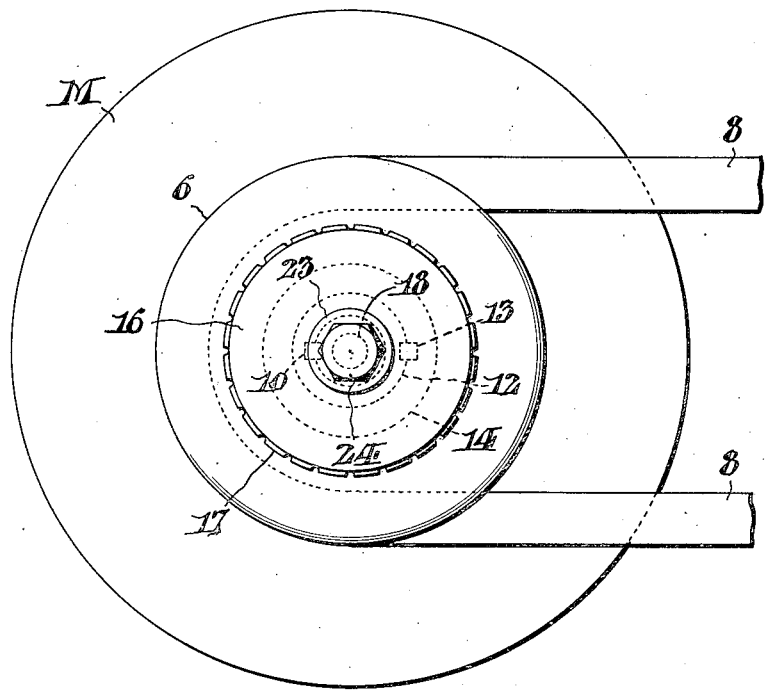
FIG. II.
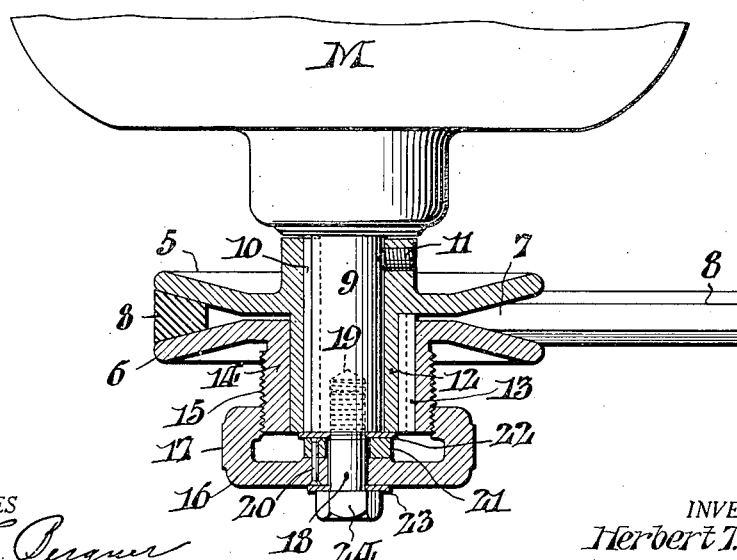
WITNESSES
INVENTOR:
Herbert T. Hunter
BY
ATTORNEYS.

Patented June 19, 1934

1,963,913

UNITED STATES PATENT OFFICE 1,963,913

PULLEY

Herbert T. Hunter, Baltimore, Md., assignor to Doughnut Machine Corporation, New York, N. Y., a corporation of New York Application July 13, 1931, Serial No. 550,438

1 Claim. (Cl. 64—8)

This invention relates to pulleys useful in the transmission of power by belt; and it has particular reference to pulleys of the V-groove type.

In the main, my invention is directed toward provision of a pulley of the kind specifically referred to, which has capacity for adjustment for the purpose of varying its effective diameter, thereby to make possible the transmission of power at correspondingly different speeds.

A further aim of my invention is to embody, in a pulley having the above indicated attribute, simple and dependable means whereby the adjustment thereof may be effectively secured against derangement, so that the desired transmission speed, for which the pulley is set, may be indefinitely maintained.

In the drawing hereunto attached, Fig. I shows an end view of an electric motor fitted with an adjustable V-groove pulley conveniently embodying my invention; and, Fig. II is a fragmentary plan view of the motor with the pulley in axial section.

As herein delineated, my improved pulley comprises a pair of opposing half components 5 and 6 which jointly afford between their discous portions, a circumferential V-groove 7 to receive a driving belt 8, having in this instance, a corresponding cross sectional configuration. The pulley component 5 is keyed to the shaft 9 of the motor M at 10, the said component being moreover rigidly secured against sliding on said shaft by means of a set screw 11. The companion half component 6 is, on the other hand, mounted on an outward hub extension 12 of the component 5 and splined to the latter at 13 with capacity for axial sliding movement toward and away from the said pulley component 5. The outward hub extension 14 of the slidable pulley component 6 is externally threaded as at 15 in Fig. II, and engaged by a hollow adjusting hand wheel 16 which may be peripherally serrated or otherwise roughened as at 17 in order that it may be firmly grasped incident to making adjustments.

As shown, the hand wheel 16 is axially bored for passage of a bolt 18, which latter takes into a tapped axial hole 19 in the end of the motor shaft 9. Secured within the hollow of the hand wheel 16, by means of a rivet 20, is a collar 21 which bears against a washer 22 placed between it and the end of the hub extension 12 of the fixed pulley component 5. There is also a washer 23 interposed between the head 24 of the screw bolt 18 and the outer face of the adjusting wheel 16.

To adjust the pulley, the screw bolt 18 is loosened, and the hand wheel 16 thereupon rotated in one direction or the other to move the pulley component 6 either away or toward the fixed component 5 in accordance with the adjustment desired. The belt 8 is thereby either forced further outward of the V-groove 7 between the component 5 and 6, or permitted to move inward closer toward the center of the pulley, for transmission of power at correspondingly different speeds through the belt 8. When the desired regulation of the pulley is obtained, the screw bolt 18 is tightened to clamp the adjusting hand wheel 16 securely to the projecting end of the hub extension 12 on the fixed pulley component 5. In this way it will be evident that the adjustment of the pulley is positively fixed against the possibility of subsequent derangement, with maintenance, therefore, of the desired transmission speed for which the pulley is set.

Having thus described my invention, I claim:

In a pulley of the type described, the combination of a pair of opposing components jointly affording a circumferential V-groove for a drive belt, one of said components being directly keyed to the shaft whereon the pulley is mounted and rigidly secured against axial movement by means of a set screw, the other having an externally screw-threaded outward hub extension and being splined to but axially shiftable relative to the first mentioned component for the purpose of varying the effective diameter of the pulley in transmitting power at correspondingly different speeds, a centrally-apertured peripherally-serrated hollow hand-wheel rotatable about the shaft and engaging the screw-threaded hub aforesaid, a collar secured by a rivet concentrically within the hollow hand-wheel, and a clamp bolt passing freely through the hand-wheel and collar, with associated inner and outer washers, for threadedly engaging axially into the pulley shaft whereby said hand-wheel is securable against rotation after the desired adjustment of the pulley has been obtained.

HERBERT T. HUNTER.